Patented Nov. 9, 1937

2,098,869

UNITED STATES PATENT OFFICE 2,098,869

ARTIFICIAL RESINS AND METHOD OF MAKING

Jesse Harmon and Frederick M. Meigs, Wilmington, Del., assignors to E. I. du Pont de Nemours & Company, Wilmington, Del., a corporation of Delaware No Drawing. Application June 17, 1936, Serial No. 85,820. In Switzerland June 20, 1935

8 Claims. (Cl. 260—4)

This invention relates to resinous condensation products and more particularly to acid soluble resinous condensation products and processes of preparing the same.

Resinous condensation products have heretofore been prepared from phenol-formaldehyde condensation products by treatment with additional formaldehyde and a strongly basic secondary amine, e. g., as disclosed in U. S. Patents Nos. 2,031,557 and 2,033,092. In these patents, not only is there no disclosure that primary amines are operative but it is definitely stated in the latter patent that primary amino groups are harmful and inoperative.

It has now been discovered that under certain conditions of reaction and with certain proportions of reactants, acid-soluble resinous reaction products of certain phenols, formaldehyde and certain primary amines may be prepared.

This invention has as an object the preparation of acid-soluble resinous condensation products of phenols, formaldehyde, and primary amines. A further object is the preparation of heat hardening, acid-soluble resinous condensation products. Further objects will appear hereinafter.

These objects are accomplished by the following invention wherein a phenol of the general formula

(wherein $R_1$ and $R_2$ are hydrogen, hydroxyl, hydroxymethyl or alkyl groups having less than three carbon atoms, and wherein there are at least two free reactive positions) is reacted with the condensation product of formaldehyde and a primary non-aromatic amine of less than seven carbon atoms and consisting of carbon, hydrogen and nitrogen only, the molal ratio of the amine to phenol being at least 0.5 to 1 and the molal ratio of formaldehyde to amine being greater than 1 to 1. The preferred molal ratio of amine to phenol and formaldehyde to amine are 1 to 1 and 2 to 1 respectively. By free reactive positions is meant unsubstituted positions ortho and/or para to phenolic hydroxyl.

In the more detailed practice of this invention, the phenol is dissolved in water or in aqueous formaldehyde, and an aqueous solution of the proper proportions of the amine and formaldehyde is added while the temperature of the mixture is kept at about 10° C. or lower. After all of the amine-formaldehyde reaction product has been added, the temperature of the mixture is allowed to rise spontaneously to room temperature or slightly above, but not as high as 50° C. When the exothermic reaction ceases, the reaction mixture is heated on a water bath until the resin separates out or until the mixture becomes too stiff to stir efficiently. It is then cooled and the resin is isolated and dried.

The intermediate reaction products of primary amines and formaldehyde may be of two types, depending upon the ratios of reactants, viz.:

1. When equimolar ratios of formaldehyde and amine are employed, compounds of the type

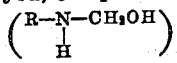

are probably formed, and these compounds presumably condense with phenolic nuclei to form compounds of the type

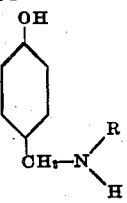

wherein R is alkyl. The latter products presumably require excess formaldehyde for resinification.

2. When two mols of formaldehyde are used for each mol. of amine, compounds of the type

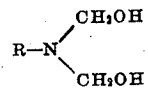

are found. These products then probably condense with phenols to form compounds of the type

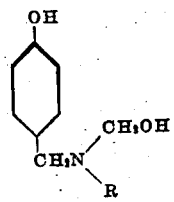

which are in themselves capable of resinification, even in the absence of excess formaldehyde, the reaction which takes place probably being as follows:

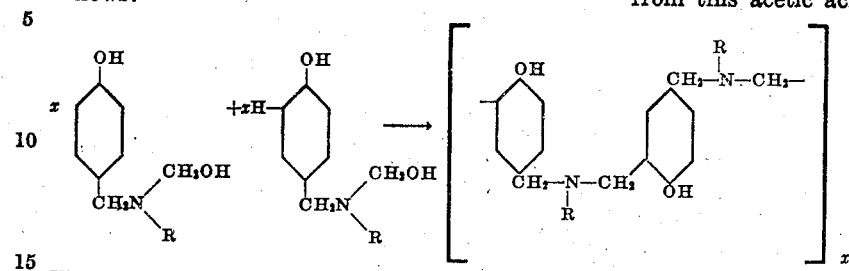

However, these last mentioned bodies can condense with excess formaldehyde in the usual phenol-formaldehyde type of condensation.

In view of the above considerations, it will be evident that an excess of formaldehyde over that required to form monomethylolamines will be required if resins are to be obtained, i. e., the molal ratio of formaldehyde to primary amine should always be greater than 1:1.

In order to produce resins which are readily soluble in aqueous acids, it is necessary to use mol. ratios of amine to phenol of at least 0.5:1, and preferably somewhat higher. With the simple phenols used in this invention, and particularly in the case of phenol itself, it is not necessary to use mol. ratios of amine to phenol substantially in excess of 1:1 since resins obtained using such ratios are sufficiently soluble in dilute aqueous acids to be useful for the purposes noted hereinafter.

The resins prepared according to this invention are all soluble in aqueous acids, i. e., the resins are all soluble to the extent of at least one gram of resin in 99 grams of a 50% aqueous solution of acetic acid. Some of them, especially those prepared from phenol itself, are soluble in 1.5 per cent acetic acid.

Having thus outlined the principles and objects of the invention, the following exemplifications thereof are added in illustration and not in limitation.

*Example I.—Phenol-formaldehyde-methylamine resin*

To a solution of 94 parts (1 mol.) of phenol in 50 parts of water there was added with stirring and cooling, at such a rate that the temperature remained below 10° C., a solution made by bubbling 31 parts (1 mol.) of methylamine into 162 parts (2 mols) of aqueous 37 per cent formaldehyde. (When methylamine is bubbled into aqueous formaldehyde solution, a vigorous exothermic reaction takes place and it is considered that dimethylolmethylamine is formed when two mols of formaldehyde to one mol. of methylamine are used.) The addition of this solution requires about an hour. The cooling bath was then removed and the temperature of the reaction mixture was allowed to rise spontaneously to 40° C. where it was held by means of a cooling bath until the exothermic reaction was over. The reaction mixture was then heated in a boiling water bath until the resinous mass which was formed was too thick to stir mechanically. It was removed from the reaction vessel while hot, cooled, and the brittle resin was ground with a little cold water to a uniform slurry. The resin was filtered, washed thoroughly with cold water, and dried in vacuo at room temperature. The yield of almost white amorphous powder was 147 parts which is 98.5 per cent of the theoretical. It was soluble in acetone, ethyl acetate, toluene, and dilute (1.5 per cent) aqueous acetic acid. A film flowed from this acetic acid solution of the resin was, after being heated at 100° C. for two hours, only slowly dissolved in 1.5 per cent aqueous acetic acid.

*Example II.—Resorcinol-formaldehyde-methylamine resin*

To a solution of 110 parts (1 mol.) of resorcinol in 200 parts of water cooled in an ice-salt bath there was quickly added at —5° C. a cold solution of 15.5 parts (.5 mol.) of methylamine in 81 parts (1 mol.) of 37 per cent aqueous formaldehyde. A thick rubbery resin formed within two minutes and the temperature rose to 10° C. An additional 200 parts of water was added, and the stirred mixture was then allowed to stand at room temperature for one-half hour. The resin, which was purified by the technique described in Example I, was light yellow in color and weighed 145 parts. It was soluble in dilute (1.5 per cent) acetic acid and in 9 per cent ammonium hydroxide solution. A film flowed from such a dilute acetic acid solution of the resin was darkened by baking at 100° C. but it remained soluble in 1.5 per cent aqueous acetic acid.

*Example III.—Phenol-formaldehyde-cyclohexylamine resin*

A mixture of 85.5 parts (.8 mol.) of 88% phenol and 91 parts (1.12 mols) of 37% formaldehyde was stirred mechanically and cooled in an ice bath. To this mixture at 5° C., there was added a solution made from 54.5 parts (.55 mol.) of cyclohexylamine and 65.5 parts (.64 mol.) of 37% aqueous formaldehyde. The ice bath was removed and the stirred reaction mixture was allowed to warm to room temperature and it was then heated gradually on a water bath up to 90° C. and was held there for 3.5 hours. It was transferred while hot to a large nickel plate, cooled, and the brittle resin was ground in a cold mortar with a little cold water to a uniform slurry. The resin was filtered, washed thoroughly with water, and dried in vacuo at room temperature. It was a light yellow, granular solid and weighed 143 parts. It was soluble in 45% acetic acid and in ethyl acetate, dioxane, pyridine, and a 90% toluene-10% ethanol mixture.

*Example IV.—Phenol-formaldehyde-ethylenediamine resin*

To one hundred seven parts (1 mol.) of 88% phenol in water in a reaction vessel equipped with a stirrer, reflux condenser, and thermometer and cooled in an ice bath was added with stirring a well-cooled mixture of 162 parts (2 mols) of 37% aqueous formaldehyde and 60 parts (1 mol.) of ethylenediamine, the temperature of the combined reaction mixture being held below 20° C. After all of the formaldehyde-amine solution had been added, the temperature of the reaction mixture was raised to 90–94° C. over a period of approximately one and one-half hours. Heating was continued at the same temperature for an additional three and one-half hours, during which time a solid resin formed in the reaction vessel. The resin was separated, ground to a white powder, filtered, washed with water and dried in vacuo. Two hundred seventy parts of a nearly white, granular solid product was obtained. It was soluble in acetone, pyridine, in 1.5% aqueous acetic acid, 3.0% formic acid, and 10% caustic soda.

*Example V.—Phenol-formaldehyde-methylamine resin*

Example I was repeated except that a solution of only 0.5 mol. of methylamine in one mol. of formaldehyde was used, and an additional 0.1 mol. of formaldehyde was added near the end of the reaction period to convert the oily product to a solid resin. This resin was soluble in 19% aqueous acetic acid, and was readily soluble in acetone, ethyl acetate, dioxane, and ethanol.

*Example VI.—Xylenol-formaldehyde-methylamine resin*

To a mixture of 122 parts (1 mol.) of symxylenol (95% pure, M. P. 60° C.) and 32.4 parts (0.4 mol.) of 37% aqueous formaldehyde contained in a reaction vessel equipped with stirrer, thermometer, and reflux condenser and cooled in an ice bath was added the product obtained by adding 34 parts (1.1 mol.) of methylamine gradually to 178 parts (2.2 mols) of 37% aqueous formaldehyde while holding the temperature below 20° C. The mixture was well stirred during this operation. After all of the dimethylolmethylamine had been added, the reaction mixture was heated to 88–92° C. over a period of approximately 23 hours. A soft yellow resinous product separated out during this time. It was washed with water until the odor of formaldehyde was no longer noticeable, and then dried in vacuo at room temperature. It was soluble in acetone, ethanol, dioxane, pyridine, a 90% toluene-10% ethanol mixture, an 80% benzene-20% ethanol mixture, and in 10% aqueous acetic acid. A film of a 20% solution of this resin in 15% aqueous acetic acid upon baking at 100° C. for about 15 hours, became insoluble in aqueous acetic acid and other organic solvents in which the resin, before baking, was soluble.

*Example VII.—Phenol-formaldehyde-n-butylamine resin*

A mixture of 73 parts (1 mol.) of n-butylamine and 162 parts (2 mols) of 37% aqueous formaldehyde was added with stirring to a solution of 94 parts (1 mol.) of phenol in 50 parts of water at 5–10° C. The mixture was then gradually warmed to 94° C. during the course of 3 hours at which time an oil began to separate from the solution. The reaction mixture was maintained at 95° C. for an additional 2 hours and then 40 parts (.5 mol.) of 37% aqueous formaldehyde was added. Heating at 95° was continued for about 5 hours, at which time a soft resin had separated. After cooling, the water layer was decanted, the resin was purified by mixing with water followed by decantation and was finally dried in vacuo. One hundred ninety parts of a soft, sticky resin was obtained. It gave turbid solutions with 1.5% acetic acid. It was completely soluble (to the extent of 10%) in 20% aqueous acetic acid and in acetone, dioxane, chloroform, toluene and ethyl acetate. Films applied to glass from aqueous acetic acid solutions of this resin were fairly hard after baking at 100° C. for 17 hours, very insensitive to water, and dissolved only very slowly in 50% aqueous acetic acid.

The reactions between the phenols and the formaldehyde-amine addition products (methylolamines) in this invention are substantially quantitative, that is, substantially all of the methylolamines combine with the phenols. Consequently, all of the resins contain at least substantially 0.5 mol. of combined amine per mol. of phenol, for ratios of amine to phenol lower than 0.5:1 are not used. For similar reasons, none of the resins contain substantially more than 1 mol. of combined amine per mol. of phenol.

By heating dilute acid solutions of the resins described herein, more viscous solutions thereof can be obtained. For example, when 45 parts of a resin prepared from phenol, formaldehyde, and methylamine was dissolved in 255 parts of a 14 per cent aqueous solution of acetic acid and heated at 100° C. the viscosity of the solution changed as follows:

| Hours heated | Viscosity (poises) |
|---|---|
| 24 | 0.7 |
| 40 | 0.9 |
| 47 | 2.2 |
| 49 | 8.5 |
| 52 | 1650.0 |
| 54 | Gelled |

Any mononuclear phenol having at least two free reactive positions (i. e., positions ortho or para to the phenolic hydroxyl), and containing only carbon, hydrogen, and oxygen, and conforming to the type

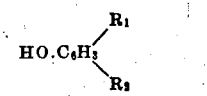

can be used in this invention. In the formula, $R_1$ and $R_2$ may be hydrogen, alkyl containing less than 3 carbon atoms, hydroxyl or hydroxymethyl. For example $R_1$ and $R_2$ may both be hydrogen, or they may both be alkyl (provided each alkyl group contains less than three carbon atoms), or one of them may be hydrogen and the other alkyl. For reasons of economy, simple, low-molecular weight phenols, particularly phenol itself, are preferably used.

Any primary non-aromatic mono- or polyamine containing less than seven carbon atoms and consisting of carbon, hydrogen, and nitrogen only can be used in this invention. By non-aromatic amine is meant an amine in which the amine nitrogen is joined to a carbon atom which is not a part of an aromatic ring. Amines falling in this class and hence suitable for use in the present invention include methylamine, ethylamine, n-propylamine, isopropylamine, n-butylamine, isobutylamine, hexylamine, amylamine, cyclohexylamine, ethylenediamine and tetramethylenediamine. The amine should be free of further reactive groups such as carboxyl, nitro, hydroxyl, sulfonic and other negative groups.

Aqueous formaldehyde may be replaced by paraformaldehyde or compounds which yield formaldehyde, especially in conjunction with water as a reaction medium.

The proportions of the phenol, the formaldehyde, and the amine used to prepare the resins of this invention may be varied within the limits specified. One of the objects of the invention is the preparation of heat-hardenable resins which are soluble in dilute acetic acid. The ratio of reactants which will give these properties varies with the nature of the phenol and of the amine used. However, for phenol itself, formaldehyde, and low-molecular weight amines, it has been found that the ratios which give resins best fulfilling these requirements are one mol. of amine per mol. of phenol and two mols of formaldehyde per mol. of amine. A lower ratio of amine usually gives resins which are less readily soluble in dilute acids or soluble only in acids of high concentration, while a higher ratio of amine has a tendency to reduce the heat-hardening properties of the products. As already explained, it is generally unnecessary to use mol. ratios of amine to phenol substantially greater than 1:1, as no additional advantages are obtained thereby. It should be definitely understood that resins prepared from amines and phenols in mol. ratios of less than substantially 0.5:1 are excluded from the scope of the present invention since such resins have no appreciable degree of acid-solubility and are hence largely unsuited for the purposes for which the resins of the invention are intended.

The proportions of formaldehyde which can be used in this invention can likewise be varied considerably. Formaldehyde in excess of that required to form dimethylolamines is not necessary except when the mol. ratio of amine to phenol is less than 1:1 since the condensation products of phenols with such dimethylolamines are capable, as explained above and as illustrated in Example I, of resinification in the absence of excess formaldehyde. An excess of formaldehyde or other aldehyde, however, can be used if desired. The invention is not limited as to the additional quantities of formaldehyde which may be used, since this will depend somewhat upon the reactants and the type of resin desired. The examples given illustrate the proportions of formaldehyde which are preferably used.

In the description of this invention and in most of the examples, the addition of the methylolamine solution has been indicated as a separate step following solution of the phenol in the solvent. However, it is not essential that the amine be added in this manner. The reactants may be added simultaneously, provided the temperature of the reaction mixture is kept low enough (i. e. below 50° C.) to prevent decomposition of the methylolamine which is formed between the amine and formaldehyde even in the presence of phenol. In other words, it is only necessary that conditions be such that the major reaction taking place is between phenol and methylolamine rather than phenol and amine or phenol and formaldehyde. Aminomethanols are formed with great rapidity at low temperatures but they are in themselves unstable and the temperature should accordingly be kept below their decomposition point until a combination with the phenol is effected.

Resins which have a greater or less solubility in aqueous acids and which resemble in many ways the resins of the above examples may be obtained by replacing a part of the phenol by such compounds as urea, thiourea, p-toluenesulfonamide, and other substances known to form resins with formaldehyde.

Acids most generally satisfactory for dissolving the resins of the present invention are acetic and formic. Other organic acids however may be used, among them glycolic, lactic, chloroacetic, propionic, tartaric, and malic acids. The acid should preferably be water-soluble and volatile. Inorganic acids such as phosphoric, hydrochloric, sulfuric, and nitric may be employed in very dilute solutions, e. g. those of the order 0.5–1.0%. Inorganic acids are of most use when the solutions are to be used immediately for the purpose intended, but they are as a rule much less satisfactory than organic acids particularly where the solutions are not to be used immediately, because of their tendency to catalyze the conversion of the resin to an insoluble form which precipitates from the solution. With any aqueous acid, it is believed that salt formation takes place between the acid and the amino nitrogen present in the resin and that solutions of the resin in aqueous acids are in reality aqueous solutions of acid salts of the resins. It is obvious, however, that the utility of the resins is in no wise affected by what actually takes place in dissolving the resin in aqueous acid. In general, it is to be understood that the invention is not limited in any way by the theoretical considerations herein set forth.

The resins described herein have a wide variety of uses. They may be artifically shaped or molded, or cast into self-supporting films. Their most valuable application however, is as coating compositions, which may range in character from simple solutions of the resin in an organic solvent, an aqueous alkali, or an aqueous acid to compositions which contain only a small amount of the resin or acid salt thereof. Typical of the latter are coating compositions in which the resin or salt thereof is present as a dispersing and/or emulsifying agent, such as (a) aqueous emulsions of materials liquid under conditions of emulsification, such as oils and waxes, (b) aqueous dispersions of materials solid under the conditions of dispersion, such as pigments, (c) compositions containing both liquids and solids. It will be understood that specific resins will be particularly well suited for specific applications, and that the aforesaid compositions may contain, when desirable, appropriate auxiliary agents such as mold or mildew inhibitors, wetting agents, antioxidants, plasticizers, insecticides, adhesives, other film-forming materials, thickeners, and the like.

Compositions containing the present amino resins are valuable for all varieties of coating, the latter word being used in its broadest sense to mean applications, not only to impervious surfaces such as metal and glass, but also to porous or fibrous bodies such as wood, brick, plaster, paper, paper pulp, asbestos, cotton, felt, wool, regenerated cellulose, etc., and articles of manufacture therefrom, such as textiles. The aforementioned coating compositions also have valuable adhesive properties and the various coated materials just mentioned may be readily glued to themselves or to one another, usually with the application of heat.

Specific uses for which these coating compositions are suitable are as follows: (1) as sizes for rayon tire cord, to improve its adhesion to rubber; (2) as sizes for transparent sheets of regenerated cellulose, to improve the anchorage thereto of printing inks, and lacquers (with or without wax), and related substances, (3) as waterproof glues in the manufacture of veneers; (4) as sizes and water-proofing agents for textiles; (5) as fixatives for acid dyes to paper; (6) as a beater size in the manufacture of chalk-filled paper; (7) as agents for sizing and delustering fabrics and for affixing water-insoluble solids thereto; (8) and as modifying agents for viscose and cellulose acetate fibers or foils to improve their affinity for acid dyes. For (1), (2), and (3), it is preferable to use a solution of the amino resin in a volatile aqueous organic acid; for (4) and (5), an aqueous emulsion of a wax such as paraffin and a fixing agent such as aluminum acetate, the amino resin being present as an emulsifying agent; for (6), the same type of emulsion as for (5), except that the fixing agent is optional; and for (7), an aqueous dispersion of titanium dioxide and/or other finely divided water-insoluble solid (which may be a mildew preventative such as salicylanilide), a wetting agent and a softener, the amino resin being present as a dispersing agent. For (8), the resins may be incorporated into the cellulose derivative solutions before or during spinning, casting, etc., or the spun fibers, foils, etc., may be impregnated, coated, or otherwise treated with the resins in any suitable manner.

The amino nitrogen containing resins described herein also find use as stabilizers for acid-yielding bodies such as chlorine-containing solvents, plasticizers, resins, and rubbers. They are, furthermore, useful as corrosion inhibitors for steel and other metals, and as surface sizes for paper, and for inhibiting the frosting of China-wood oil modified polyhydric alcohol-polycarboxylic acid resins when incorporated therein in relatively small proportions.

The resins described herein are highly advantageous in that they are soluble in many common organic solvents, in aqueous solutions of volatile organic acids, or in aqueous alkalies in which forms they can be used for many purposes. The free base polymers described herein form insoluble films on baking. From solution in alkali, the free base polymer may be regenerated by addition of the stoichiometrical amount of acid.

The above description and examples are intended to be illustrative only. Any modification of or variation therefrom which conforms to the spirit of the invention is intended to be included within the scope of the claims.

We claim:

1. Process which comprises adding to a solution of 94 parts of phenol in 50 parts of water over a period of one hour, a solution of 31 parts of methylamine in 162 parts of aqueous 37% formaldehyde, maintaining the temperature of the reaction mixture below 10° C. during the addition, thereafter allowing the temperature of the reaction mixture to rise to 40° C., maintaining the reaction mixture at that temperature until the exothermic reaction is complete, heating at 100° C. until the resinous mass thickens, grinding the cooled brittle resin with water to a slurry, filtering, washing and drying.

2. Process which comprises reacting one mol. of phenol with a solution of one mol. of methylamine in 2 mols of aqueous formaldehyde, maintaining the reaction mixture at 10° during the mixing and thereafter at 40° C. until the exothermic reaction is complete, heating at 100° C. and then purifying the resin.

3. The product of the process of claim 2.

4. Process which comprises reacting one mol. of phenol with one mol. of methylamine and two mols of aqueous formaldehyde, the temperatures of the reaction mixture being kept below 50° C. until the amino methanol (from the amine and formaldehyde) has substantially completely reacted with the phenol and thereafter heating to resinification.

5. Process which comprises reacting one mol. of phenol with 0.5 to 1.0 mol. of methylamine and more than one mol. of formaldehyde per mol. of methylamine, the temperatures of the reaction mixture being kept below 50° C. until the amino methanol (from the amine and formaldehyde) has substantially completely reacted with the phenol and thereafter heating to resinification.

6. The product of the process of claim 4.

7. Process which comprises reacting one mol. of a phenol of the formula

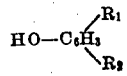

(wherein $R_1$ and $R_2$ are hydrogen, hydroxyl, methylol or alkyl groups of not more than 2 carbon atoms each and wherein there are at least two free reactive positions) with 0.5 to 1.0 mol. of a primary non-aromatic amine of less than seven carbon atoms wherein the non-amino portion of the amine is a non-aromatic hydrocarbon radical and with more than one mol. of formaldehyde per mol. of amine, the temperatures of the reaction mixture being kept below 50° C. until the amino methanol (from the amine and formaldehyde) has substantially completely reacted with the phenol and thereafter heating to resinification.

8. The product of the process of claim 7.

JESSE HARMON.
FREDERICK M. MEIGS.